Oct. 7, 1958  K. A. WRIGHT ET AL  2,855,052
STOP COLLAR FOR A WELL PIPE

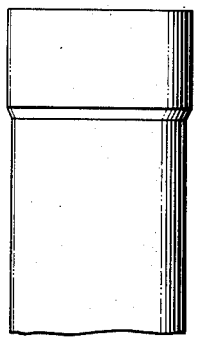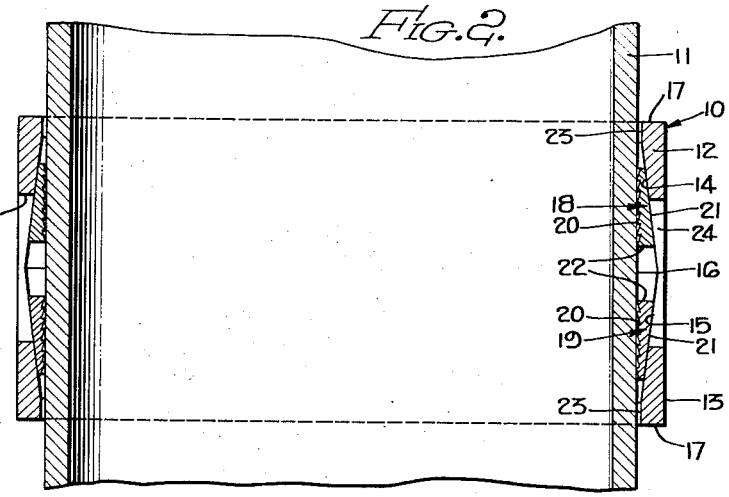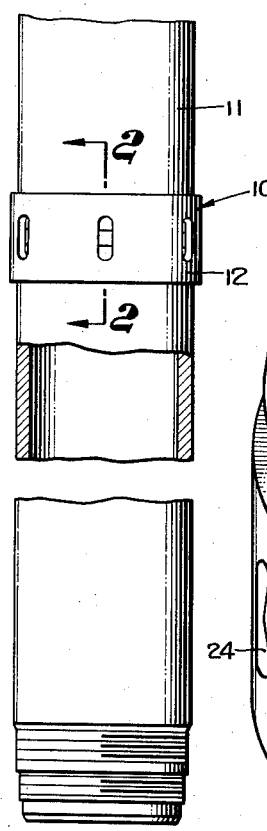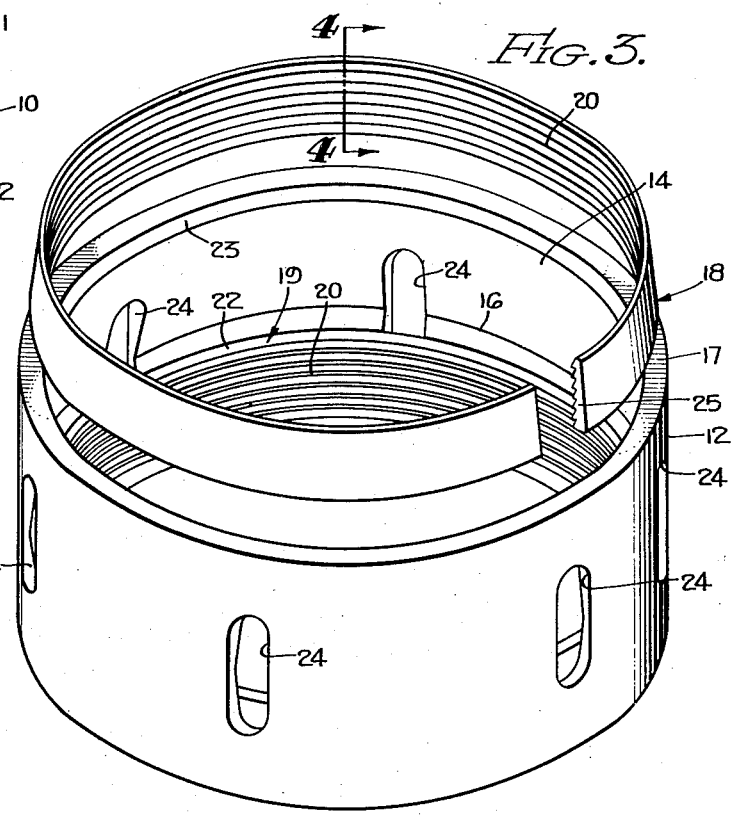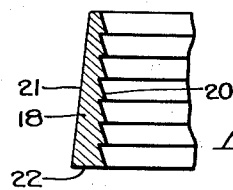

Filed Oct. 11, 1954  3 Sheets-Sheet 2

INVENTORS
KENNETH A. WRIGHT
KENNETH W. SOLUM
BY
Lyon & Lyon
ATTORNEYS

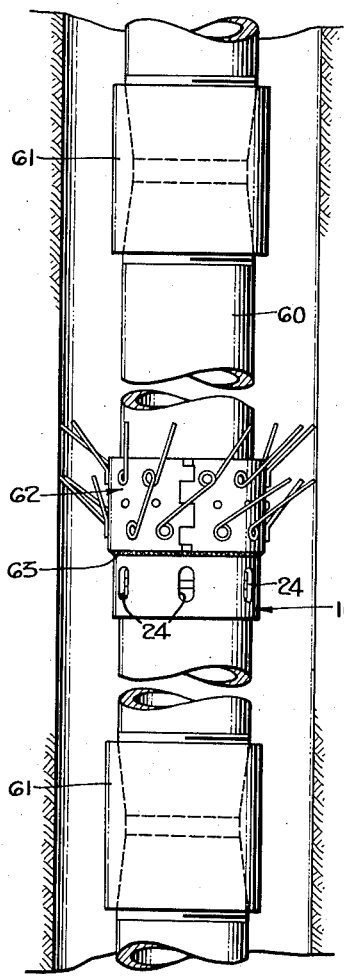
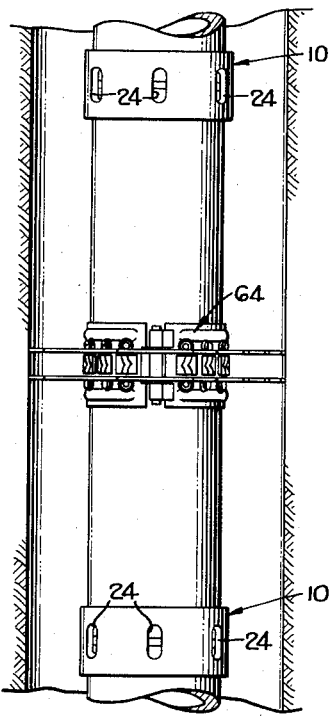
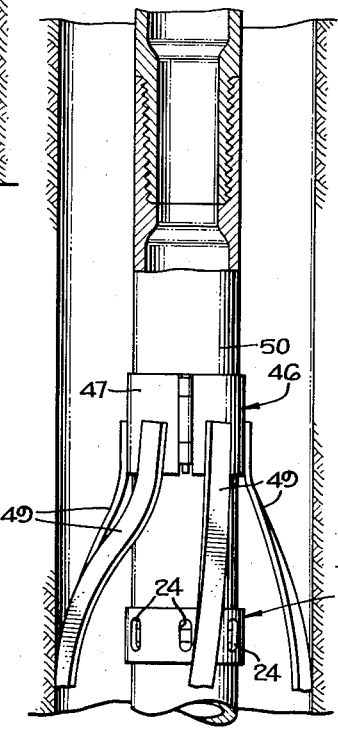
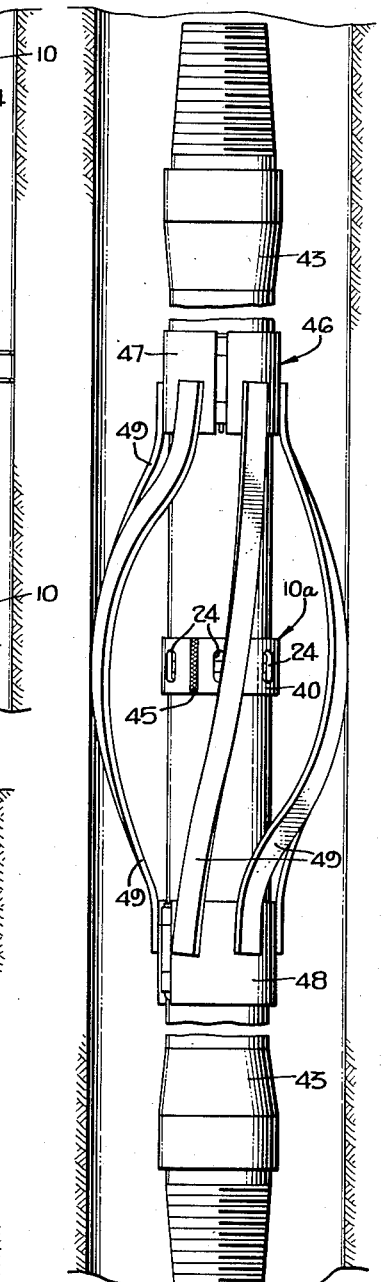

United States Patent Office 2,855,052
Patented Oct. 7, 1958

2,855,052

STOP COLLAR FOR A WELL PIPE

Kenneth A. Wright, Los Angeles, and Kenneth W. Solum, Long Beach, Calif., assignors to B & W, Inc., Torrance, Calif., a corporation of California Application October 11, 1954, Serial No. 461,412

6 Claims. (Cl. 166—243)

This invention relates to well drilling and production apparatus and is particularly directed to an improved form of stop collar adapted to be anchored on a well pipe and without requiring any welding to be performed on the pipe.

Well scratchers of the general type shown in the Wright Patent No. 2,392,352 may be rotatably mounted on a well casing and free to travel between shoulders or stops provided on the casing. When the casing consists of pipe lengths connected by internally threaded separate collars, the ends of the collars form abutments or shoulders which define limit stops for the well scratchers. However, certain types of casing are substantially flush on the outer diameter, and the threaded connections are formed directly between adjacent lengths of pipe and the separate coupling collar is omitted. In such case there are no abutments to provide limit stops on the casing. High strength casing now in use cannot ordinarily be welded without danger of cracking or otherwise weakening the casing, and therefore abutment collars or other forms of abutments cannot be welded directly to the casing to provide limit stops for the well scratcher.

The same problem of providing an abutment collar arises in connection with the mounting of centralizers on casing. When the casing string employs separate threaded collars the abutments of these collars provide limit stops which may be used for limiting the axial movement of the centralizer along the casing. When the casing is flush on its outer diameter and the connection collars are omitted there are no abutment shoulders present for cooperation with the centralizers.

The problem of providing suitable abutment shoulders for well scratchers and casing centralizers also arises when the casing is equipped with integral upset ends for threaded connection to adjacent sections of casing. Since the upset portions are formed integrally it is not possible to slide a close fitting abutment collar over the end of the casing section, and if the casing is of the high strength type an abutment collar cannot be welded to the pipe.

In accordance with our invention we provide a stop collar for casing which is fixed on the outer surface of the casing without the use of welding and which may be used on flush casing or on casing having integral upset ends.

It is another object to provide a stop collar employing a ring having a double tapered inner surface with the maximum thickness at the ends of the ring and employing a pair of split wedge rings with outer tapered surfaces which fit within the collar ring and which serve as wedges to fix the collar on the pipe.

Another object is to provide a device of this type having minimum radial thickness.

Another object is to provide a device of this type in which the split wedge rings set up hoop tension stresses in the collar ring to clamp it relative to the pipe.

Another object is to provide a device of this type in which access windows are located in the collar ring so that a tool may be inserted to spread the split wedge rings axially.

A further object is to provide a windowed collar ring of this type formed of material which may readily be deformed to hold the split wedge rings in spread-apart position so that the stop collar assembly is anchored securely on the pipe.

Other and more detailed objects and advantages will appear more fully hereinafter.

In the drawings:

Figure 1 is a side elevation partly in section showing a length of casing having a stop collar thereon of the type embodying my invention.

Figure 2 is a sectional view taken substantially on the line 2—2 as shown in Figure 1.

Figure 3 is a perspective view of the collar, one of the split wedge rings being shown above the collar prior to insertion therein.

Figure 4 is a sectional detail taken substantially on the line 4—4 as shown in Figure 3.

Figure 14 is a side elevation of a centralizer showing a stop collar embodying this invention positioned on a casing having integrally upset ends, together with a spiral centralizer mounted on the casing and spanning the stop collar.

Figure 15 is a view similar to Figure 14 showing a casing centralizer in position on casing having flush outer diameter, and showing a stop collar of our invention positioned between the ends of the centralizer.

Figure 16 is a side elevation showing a well scratcher mounted on the casing and welded to a stop collar embodying our invention.

Figure 17 shows another form of well scratcher rotatably mounted on a well casing and positioned between stop collars embodying our invention.

Figure 5:
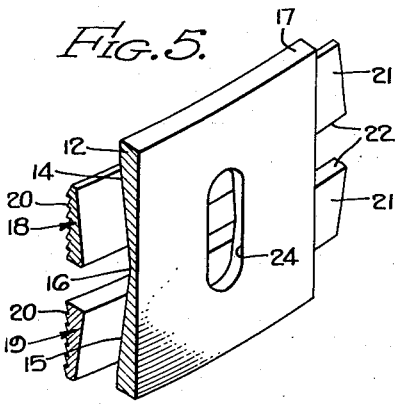
Figure 5 is a fragmental sectional perspective view showing the position of the split rings with respect to the collar ring.
Figure 6:
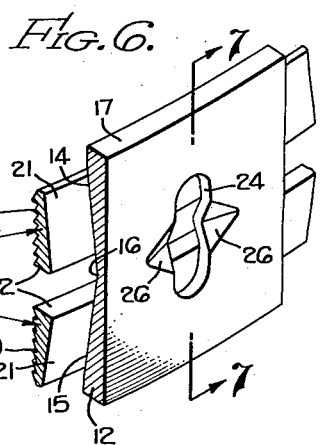
Figure 6 is a view similar to Figure 5 showing the material of the collar ring deformed to maintain the split wedge rings in axially separated position.
Figure 7:
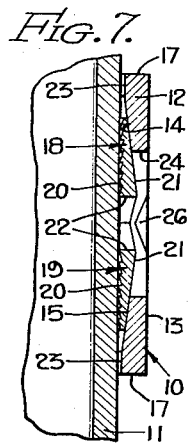
Figure 7 is a sectional view taken on the line 7—7 as shown in Figure 6.

Referring to the drawings, the stop collar assembly generally designated 10 is mounted on a section of well casing 11. This assembly 10 includes a collar ring or body 12 which is completely annular and is not split. The outer surface 13 of the body 12 is cylindrical while the inner surface is formed by two oppositely tapered surfaces 14 and 15 which meet along a circular junction line 16. The radial thickness of the body 12 is at a minimum adjacent the junction line 16 and is a maximum adjacent the upper and lower ends of the body or collar ring 12. The ends of the collar ring 12 provide abutment surfaces 17.

A pair of split annular wedge rings 18 and 19 are positioned within the collar ring 12. The inner surface of each of these collar rings is serrated to provide circumferentially extending wicker teeth 20 for engagement with the outer circumference of the casing 11. The outer surface 21 of each of the split wedge rings is tapered to cooperate with the tapered surfaces 14 and 15 provided in the collar ring or body 12.

When the large ends 22 of the split wedge rings 18 and 19 are brought into engagement adjacent the junction line 16, the inner serrated surfaces 20 are moved out of contact with the casing and extend no further inwardly than the aligned bores 23 at opposite ends of the collar ring 12. When the split wedge rings 22 are thus retracted to their mutually abutting position with their large ends in contact, the stop collar assembly 10 including the body 12 and wedge rings 18 and 19 may be installed over the lower end of the casing as shown in Figure 1. When the stop collar assembly 10 is located in the proper position axially of the length of casing 11 the split wedge rings 18 and 19 are axially separated to wedge the body 12 tightly in position on the casing 11.

Windows 24 are provided at intervals around the circumference of the body 12, and these windows extend completely through the wall thickness of the body 12. Any convenient form of tool such as a chisel or screw driver may be inserted through the windows 24 and into position between the ends 22 of the split wedge rings 18 and 19. By means of such a tool the wedge rings may be spread apart axially so that the wickered surfaces 20 are driven into the outer surface of the pipe and so that the hoop tension stresses are set up on the body or collar ring 12. The wedge rings 18 and 19 are substantially duplicates and the wicker teeth 20 are cut in a direction to prevent movement of the split wedge rings from spaced locking position back toward their retracted position within the taper bores 14 and 15. The gap 25 between adjacent ends of each of the split wedge rings 18 and 19 enables the latter to be contracted in diameter as each is moved from retracted position inwardly along the tapered surfaces 14 and 15.

After the split wedge rings 18 and 19 have been axially separated into locking position, the material of the body or collar ring 12 may be struck with a hammer or other blunt instrument in the region of the windows 24 in order to form indentations 26 which extend between the large ends 22 on the elements 18 and 19. These depressions or indentations 26 are clearly shown in Figures 6 and 7. The form of our invention as shown in Figures 1–7 employs a continuous collar ring or body 12 which is not split at any point. Such a ring is suitable for an assembly which is to be installed on casing having at least one end free from an external upset. Such a stop ring assembly 10 may be employed on casing having only one end upset as shown in Figure 1, or upon casing on which neither end is upset and on which internally threaded connecting collars are provided, as shown in Figure 16. This stop collar assembly 10 is also employed in the externally flush joint casing of the type shown in Figure 15.

Figure 8:
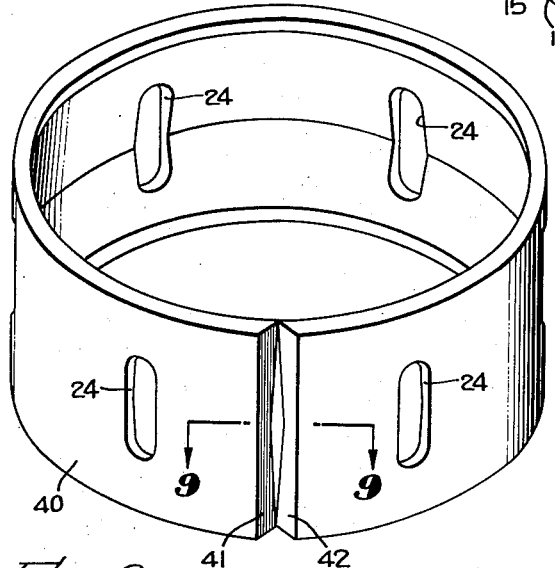
Figure 8 shows a modified form of collar ring which is split at one side so that it may be expanded sufficiently to pass over the upset portion on the end of a casing section having upset integral ends.
Figure 9:
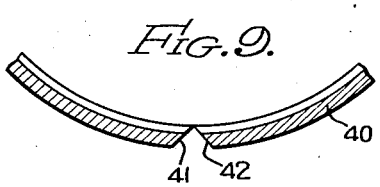
Figure 9 is a fragmental sectional view taken substantially on the line 9—9 as shown in Figure 8.
Figure 10:
Figure 10 is a perspective view of an insert filler piece used in connection with the welding together of the adjacent ends of the split collar ring shown in Figure 8.
Figures 12, 13:
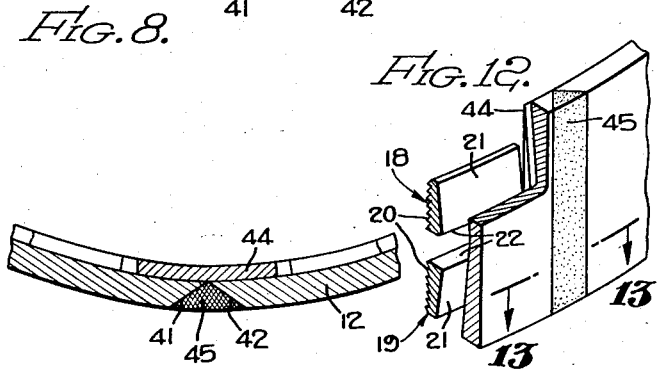
Figure 12 is a sectional perspective view partly broken away showing the position of the parts after the ends of the split collar ring are welded together.
Figure 13 is a sectional detail taken substantially on the line 13—13 as shown in Figure 12.
Figure 11:
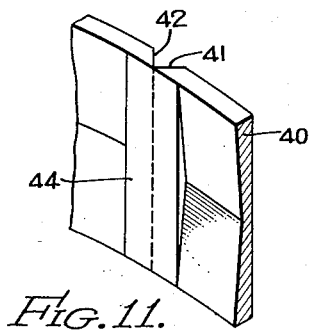
Figure 11 is a perspective view showing the insert piece in place within the split collar ring.

However, when casing is employed which is of the general type shown in Figure 14, and wherein both ends of each casing length are integrally upset the continuous non-split collar ring 12 cannot be employed because it will not pass over the enlarged upset ends. In this event we provide a modified form of collar ring or body 40 as shown in Figure 8. This collar ring is provided with adjacent ends 41 and 42 which are bevelled so that they may be later joined by fusion welding. When this form of our invention is employed the split collar ring 40 is expanded sufficiently to enable it to be passed over one of the upset ends on the casing 43. The split wedge rings 18 and 19 are in position within the body 40 during this installation. When the body 40 is in the proper position axially of the length of casing 43 the insert piece 44 is installed between the body 40 and the casing 43 and in position adjacent the opposed ends 41 and 42. This insert piece 44 is shown in position in Figures 11, 12 and 13. The purpose of this insert piece 44 is to shield the casing 43 from direct contact by the electric arc while a fusion weld is being formed between the opposed ends 41 and 42. This piece 44 further serves as a back-up piece which increases the strength of the joint between the opposed ends 41 and 42 when the weld metal 45 is deposited by means of the electric arc. It will be understood that any suitable form of fusion welding may be used for joining the adjacent ends 41 and 42 of the split collar ring 40.

The inner surfaces of the collar ring 40 are oppositely tapered in a manner similar to that described in connection with the collar ring 12 so that the same form of split wedge rings 18 and 19 may be used. The collar ring 40 is also provided with the same form of windows 24 as previously described. After the ends 41 and 42 of the split ring are joined by fusion welding the split wedge rings 18 and 19 are spread apart in the same manner described above. Furthermore, the material of the collar ring 40 may be indented as heretofore described in order to maintain the split wedge rings in axially spaced locking position. When the split wedge rings 18 and 19 are spread apart the weld metal 45 is subjected to the hoop tension stresses set up in the collar ring 40.

In Figure 14 we have shown the stop collar assembly 10a employing the initially split body 40. A spiral centralizer generally designated 46 is provided with spaced collars 47 and 48 connected by outwardly bowed spring staves 49. The collar 47 is positioned above the stop collar assembly 10a and the collar 48 is positioned below it. The collars 47 and 48 are preferably hinged so that the centralizer 46 may be applied laterally to the casing 43.

In Figure 15 we have shown casing 50 which is flush on the outside diameter. A centralizer 46 is mounted on the casing and is limited in its axial sliding movement thereon by means of the stop collar assembly 10 which is of the type illustrated in Figures 1–7. This collar 10 is fixed on the casing 50 and is positioned between the end collars of the casing centralizer 46 in the same manner as illustrated in Figure 14.

Figure 16 shows casing 60 of the conventional type which consists of pipe lengths connected by internally threaded collars 61 of larger diameter. A well scratcher 62 is fixed on the length of the casing 60 between the threaded coupling collars 61; the stop collar assembly 10 is fixed to the casing in the manner described above, and the scratcher assembly 62 is connected to it by means of the weld 63. In this way the scratcher 62 is fixed to the casing 60 without any welding to the metal of the casing 60. The weld 63 connects the scratcher assembly 62 to the stop collar 10 but does not contact the pipe 60.

Figure 17 shows a pair of stop collar assemblies 10 fixed on a well casing in axially spaced position. The well scratcher assembly 64 is rotatably mounted on the casing and positioned between the stop collars 10.

Having fully described our invention, it is to be understood that we do not wish to be limited to the details herein set forth, but our invention is of the full scope of the appended claims.

We claim:

1. In a stop collar assembly for a well pipe, the combination of: an annular collar ring having a cylindrical external surface, the collar ring having two internal surfaces tapering radially inwardly from a region near the center of the collar ring to regions near the ends of the collar ring, a pair of split wedge rings, each of the wedge rings having a serrated inner surface for contact with the pipe and an outer tapered surface to engage within one of the tapered internal surfaces of the collar ring, the collar ring having a plurality of circumferentially spaced window openings extending laterally therethrough, the window openings providing access space to admit a tool for spreading the split wedge rings axially for anchoring the collar ring relative to the pipe, the material of the collar ring being deformable near the window openings for maintaining the split wedge rings in axially spaced relation.

2. In a stop collar assembly for a well pipe, the combination of: an annular collar ring split at one side so that it may be expanded diametrically to pass over an enlargement on the pipe, the inner surface of the collar ring being double-tapered from a location midway between the ends of the collar ring to the ends thereof, an axially extending filler piece having a complementary double-tapered surface arranged to fit within the collar ring adjacent the split therein, weld metal integrally joining the adjacent ends of the ring and said filler piece, a pair of split wedge rings each having a serrated inner surface and a tapered outer surface, the wedge rings being received within the collar ring and each engaging one of the tapered surfaces therein.

3. In a stop collar assembly for a well pipe, the combination of: an annular collar ring having a cylindrical external surface, the ring being split at one side so that it may be expanded diametrically to pass over an enlargement on the pipe, the collar ring having two oppositely tapered internal surfaces tapering from a location substantially midway between the ends of the collar ring to the ends thereof, an axially extending filler piece having a complementary double-tapered surface arranged to fit within the collar ring adjacent the split therein, weld metal integrally joining the adjacent ends of the ring and said filler piece, a pair of split wedge rings each having a tapered outer surface and a serrated inner surface, the wedge rings being received within the collar ring and each engaging one of the tapered surfaces therein.

4. In a stop collar assembly for a well pipe, the combination of: an annular collar ring having a cylindrical external surface, the ring being split at one side so that it may be expanded diametrically to pass over an enlargement on the pipe, the collar ring having two oppositely tapered internal surfaces tapering from a location substantially midway between the ends of the collar ring to the ends thereof, an axially extending filler piece having a complementary double-tapered surface arranged to fit within the collar ring adjacent the split therein, weld metal integrally joining the adjacent ends of the ring and said filler piece, a pair of split wedge rings each having a tapered outer surface and a serrated inner surface, the wedge rings being received within the collar ring and each engaging one of the tapered surfaces therein, the collar ring having circumferentially spaced window openings extending laterally therethrough to provide access to the wedge rings for moving them axially.

5. In a stop collar assembly for a well pipe, the combination of: an annular collar ring having two oppositely tapered axially extending internal surfaces, the surfaces separating radially inwardly from a central region on the collar ring, a pair of wedge elements each having a serrated inner surface for contact with the well pipe and an outer tapered surface engaging one of said tapered internal surfaces, the collar ring having at least one axially extending window opening projecting laterally therethrough, and symmetrically positioned with respect to said tapered internal surfaces, the window opening projecting through said central region of the collar ring and providing space through which means may extend to separate the wedge elements axially into pipe gripping position.

6. The combination set forth in claim 5 in which the internal surfaces are frustroconical and wherein the wedge elements comprise split annular rings.

References Cited in the file of this patent
UNITED STATES PATENTS

| | | |
|---|---|---|
| 331,522 | Meese | Dec. 1, 1885 |
| 743,932 | Rudd | Nov. 10, 1903 |
| 2,017,994 | Spang | Oct. 22, 1935 |
| 2,392,352 | Wright | Jan. 8, 1946 |
| 2,460,631 | Fawick | Feb. 1, 1949 |
| 2,546,582 | Baker | Mar. 27, 1951 |
| 2,683,491 | Gassaway | July 13, 1954 |